May 16, 1933.　　J. HOPKINSON ET AL　　1,909,582
DASHPOT
Filed Nov. 26, 1930
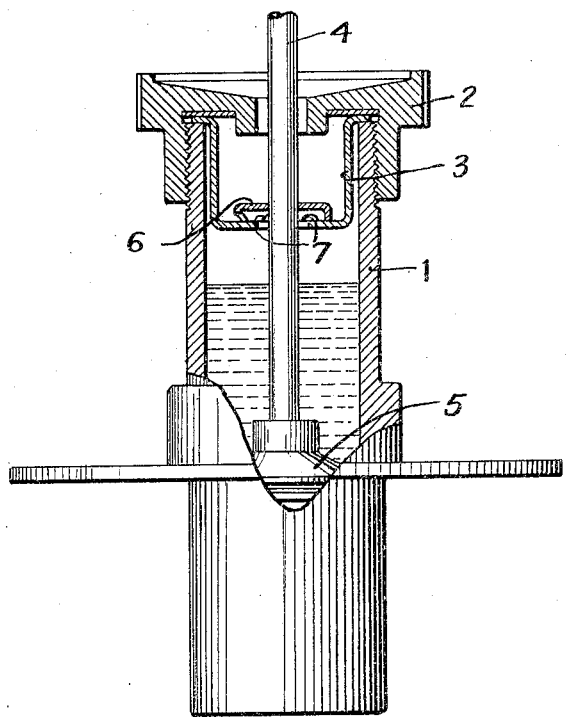
INVENTOR
Joseph Hopkinson
BY ATTORNEY Eugen Hann
W. M. Wilson Patented May 16, 1933

1,909,582

UNITED STATES PATENT OFFICE

JOSEPH HOPKINSON, OF PARIS, FRANCE, AND EUGEN KAUN, OF SINDELFINGEN, GERMANY, ASSIGNORS TO DAYTON SCALE COMPANY, OF DAYTON, OHIO, A CORPORATION OF NEW JERSEY

DASHPOT

Application filed November 26, 1930, Serial No. 498,318, and in Germany December 5, 1929.

This case relates to weighing scales and particularly to the dash pot thereof used for damping the sudden movements of the scale parts. The dash pots are usually filled with some liquid, such as glycerine, in which the piston is movable. A sudden movement of the piston upon the application or removal of a load from the scale tends to cause a surge of the liquid in the dash pot. This results in the liquid splashing through the opening in the cylinder head surrounding the piston rod.

The object of the invention is to provide novel means for preventing splashing of the oil through the piston rod opening in the cylinder head.

Further, the object is to provide a surge preventing means which at the same time can be easily assembled on the dash pot piston.

Still further the object is to provide such a surge preventing means which will not interfere or take part in the usual movement of the piston in the fluid.

Various other objects and advantages of our invention will be obvious from the following particular description of one form of mechanism embodying the invention or from an inspection of the accompanying drawing; and the invention also constitutes certain new and novel features of construction and combination of parts hereinafter set forth and claimed.

The drawing shows a section through the dash pot utilizing the present invention.

In detail the dash pot comprises a cylinder 1 to which is threadedly assembled the cylinder cover or head 2. Clamped between the upper edge of the cylinder 1 and the lower face of the cylinder cover 2 is the upper lip or flange of a cup-shaped member 3. The cover 2 and the cup 3 have central openings through which the piston rod 4 of the plunger 5 is movable. As is well known in the scale art, (see Patents 1,114,307, 1,602,604, and 1,614,682) the plunger does not touch the walls of the cylinder, thereby permitting the liquid in the vessel to flow freely from one side of the plunger to the other. Surrounding the piston rod and within the cup 3 is a valve plate 6 having the edges thereof bent downwardly and normally in engagement with the bottom of the cup 3. The vertical sides of the valve 6 are provided with openings 7 whereby fluid entering into the cup 3 may return through the openings 7 into the cylinder proper. The valve 6 is of such specific gravity relative to the damping fluid as to remain at the bottom of the cup 3 against the upward force of the liquid when it moves under the impulses of the piston 5. However, the valve 6 is not rigidly connected with the cup 3 so that it may upon the application of an unusual surging of the liquid in the dash pot move upwardly. This gives a flexibility to the operation of the valve which obviates unnecessary strains on the several parts of the dash pot.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

We claim:

1. A dash pot for scales comprising a cylinder, a piston movable within said cylinder, a valve within the cylinder and above the normal level of the liquid in the cylinder, and means for holding said valve in said position, said valve having openings therein through which the liquid may flow.

2. A dash pot for scales comprising a cylinder, a piston movable within said cylinder, a valve within the cylinder and above the normal level of the liquid in the cylinder, and means for holding said valve in said position, said holding means for the valve comprising a cup-shaped member on the bottom of which said valve rests.

3. A dash pot comprising a cylinder containing a liquid, a piston movable in said liquid, a cup-shaped member above the normal level of said liquid within said cylinder, a valve carried by the cup-shaped member and surrounding the piston rod of the piston, said valve being free to move relative to the cup-shaped member and the piston rod upon the surging of the liquid in the dash pot under the impulses of the piston.

4. A dash pot such as defined in claim 3, said valve having openings through which the liquid entering said cup-shaped member may flow back into the cylinder proper.

5. A dash pot such as defined in claim 3, said cup-shaped member having an outwardly extending lip at its upper end and said cylinder having a removable cover for clamping said lip against the upper edge of the cylinder.

6. A dash pot comprising a cylinder containing a liquid, a piston movable within said cylinder, a cup-shaped chamber within said cylinder having the bottom thereof extending closely adjacent the piston rod and normally above the level of the liquid, a valve member supported by the bottom of the cup-shaped chamber to regulate surging of the liquid into and out of the chamber under influence of the piston, and a removable cylinder cover for clamping the chamber to said cylinder.

7. A dash pot comprising a vessel, a member having a portion spaced from the upper end of the vessel which portion is provided with an opening, a piston and piston rod movable within the vessel, the piston rod being freely movable through said opening, fluid being adapted to flow through said opening into the space between said portion and the upper end of the vessel, and a valve supported by the member for coacting with the opening to restrict the flow of the fluid therethrough.

8. A dash pot comprising a vessel, a plunger movable therein, an inverted cup-shaped valve having ports formed by notching the sides of the cup at the lower free end, and a member rigid relative to said vessel for engaging the lower free edge of the valve to support the valve for movement under influence of the plunger.

In testimony whereof we hereto affix our signatures.

JOSEPH HOPKINSON.
EUGEN KAUN.